United States Patent
Stanley et al.

(10) Patent No.: US 11,007,441 B2
(45) Date of Patent: May 18, 2021

(54) SYSTEMS AND METHODS FOR EVOLVING CONTENT FOR COMPUTER GAMES

(75) Inventors: Kenneth O. Stanley, Oviedo, FL (US); Erin J. Hastings, Orlando, FL (US)

(73) Assignee: University of Central Florida Research Foundation, Inc.

(*) Notice: Subject to any disclaimer, the term of this patent is extended or adjusted under 35 U.S.C. 154(b) by 758 days.

(21) Appl. No.: 12/820,431

(22) Filed: Jun. 22, 2010

(65) Prior Publication Data
US 2010/0323775 A1 Dec. 23, 2010

Related U.S. Application Data

(60) Provisional application No. 61/219,107, filed on Jun. 22, 2009.

(51) Int. Cl.
| | |
|---|---|
| *A63F 13/00* | (2014.01) |
| *A63F 13/69* | (2014.01) |
| *A63F 13/55* | (2014.01) |
| *A63F 13/79* | (2014.01) |
| *A63F 13/67* | (2014.01) |

(52) U.S. Cl.
CPC .............. *A63F 13/69* (2014.09); *A63F 13/55* (2014.09); *A63F 13/67* (2014.09); *A63F 13/79* (2014.09); *A63F 2300/575* (2013.01); *A63F 2300/6009* (2013.01); *A63F 2300/6027* (2013.01)

(58) Field of Classification Search
CPC .......... A63F 13/69; A63F 13/79; A63F 13/67; A63F 13/55; A63F 2300/575; A63F 2300/6009; A63F 2300/6027

USPC .................................................... 463/2
See application file for complete search history.

(56) References Cited

U.S. PATENT DOCUMENTS

| | | | |
|---|---|---|---|
| 2004/0143852 A1* | 7/2004 | Meyers | 725/133 |
| 2008/0139318 A1* | 6/2008 | Van Luchene et al. | 463/42 |

OTHER PUBLICATIONS

Erin J. Hastings, Ratan K. Guha, Kenneth O. Stanley; "Interactive Evolution of Particle Systems for Computer Graphics and Animation,"—IEEE Transactions on Evolutionary Computation, NY, IEEE Press, 2009, pp. 1-15.

Erin J. Hastings, Ratan K. Guha, Kenneth O. Stanley; "NEAT Particles: Design, Representation, and Animation of Particle System Effects," IEEE Symposium on Computational Intelligence and Games, 2007, pp. 1-7.

Kenneth O. Stanley, Risto Mikkulainen; "Evolving Neural Networks Through Augmenting Topologies," Evolutionary Computation 10(2): 2002, pp. 99-127.

(Continued)

*Primary Examiner* — Kang Hu
*Assistant Examiner* — Thomas H Henry
(74) *Attorney, Agent, or Firm* — Bond Schoeneck & King, PLLC; George R. Mcguire

(57) ABSTRACT

Systems and methods of evolving content for computer games are disclosed. One such method comprises tracking popularity according to one or more users of at least a portion of a plurality of game content items available in a game world. The game world is associated with the game. The game world also comprises evolving an additional game content item based on the popularity of the tracked game content items. The usage of each tracked game content item determines a reproduction availability of the tracked game content item. The game world also comprises inserting the additional game content item into the game world.

4 Claims, 6 Drawing Sheets

(56) References Cited

OTHER PUBLICATIONS

Erin J. Hastings, Ratan K. Guha; Kenneth O. Stanley; "Evolving Content in the Galactic Arms Race Video Game," IEEE, 2009, pp. 241-248.
Erin J. Hastings, Ratan K. Guha, Kenneth O. Stanley, "Automatic Content Generation in the Galactic Arms Race Video Game," IEEE Transactions on Computational Intelligence and A1 in Games, vol. 1, Issue 4, Dec. 2009, pp. 1-19.

* cited by examiner

SYSTEMS AND METHODS FOR EVOLVING CONTENT FOR COMPUTER GAMES

CROSS REFERENCE TO RELATED APPLICATIONS

This application claims the benefit of U.S. Provisional Application No. 61/219,107, filed Jun. 22, 2009, which is hereby incorporated by reference.

FIELD OF THE DISCLOSURE

The present disclosure relates generally to computer games, and more specifically, to systems and methods of evolving content for computer games.

BACKGROUND

Video game players and developers are familiar with the concept of "game content," which are objects which players encounter, wield, and/or interact with while playing a game. Some examples of game content are levels, maps, terrain, models, textures, weapons, vehicles, objects, items, etc. Some game developers provide tools which enable players to create their own content, but these tools usually require significant effort to master and specialized knowledge beyond that of most players. Other games include a mechanism for randomizing content (e.g., a random map generator). But randomization is useful only if it is tightly constrained to avoid generating undesirable content, and provides no means to direct the new content toward the kind of content that players prefer.

DETAILED DESCRIPTION

Disclosed herein is an algorithm for evolving game content which automatically evolves novel game content based on player behavior, as the game is played. Specifically, new content evolves based on player interaction with existing content. Application of this algorithm allows for games that generate their own content to satisfy players, which has the potential to significantly reduce the cost of content creation and to increase the replay value of games.

Figure 1:
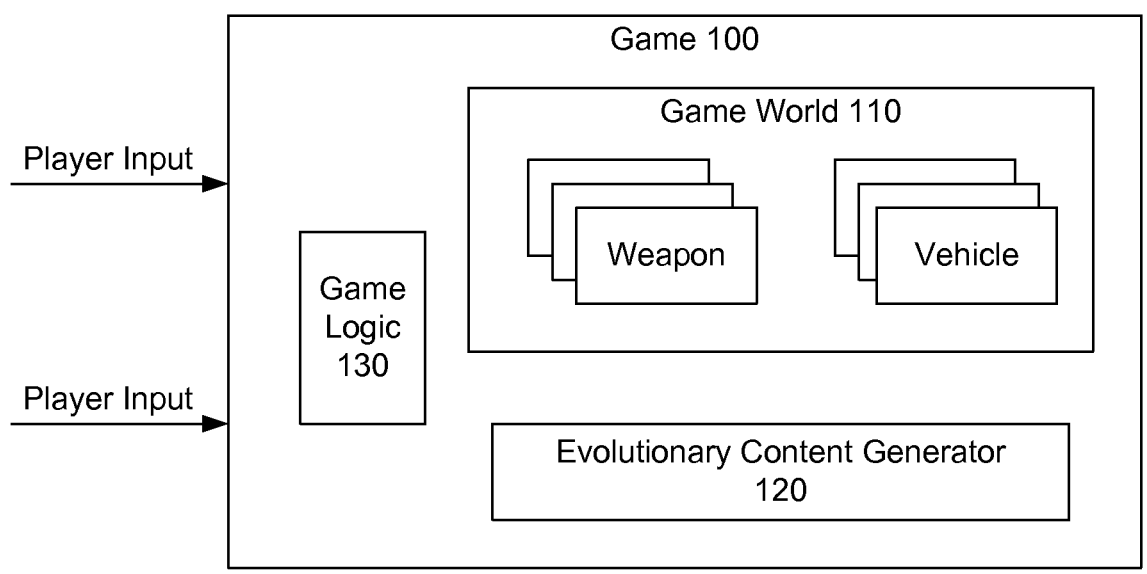
FIG. 1 is a block diagram of a computer game.

FIG. 1 is a block diagram of a computer game 100, which may be implemented on a general-purpose computer, a specialized game console, or any other computing device (e.g., mobile phone, personal digital assistant, media player, etc.). Game 100 includes game logic 130, game world 110, and evolutionary content generator 120. Game world 110 includes the set of content items (e.g., levels, terrain, maps, models, textures, weapons, vehicles, etc.) which are available to interact with players during the game. In the example of FIG. 1, game world 110 includes two types of content items—weapons and vehicles—and three instances of each. Evolutionary content generator 120 generates new content items and inserts the new content into game world 110. Game logic 130 receives player inputs and processes these inputs to drive player interaction with game world 110, resulting in game play.

Figure 2A:
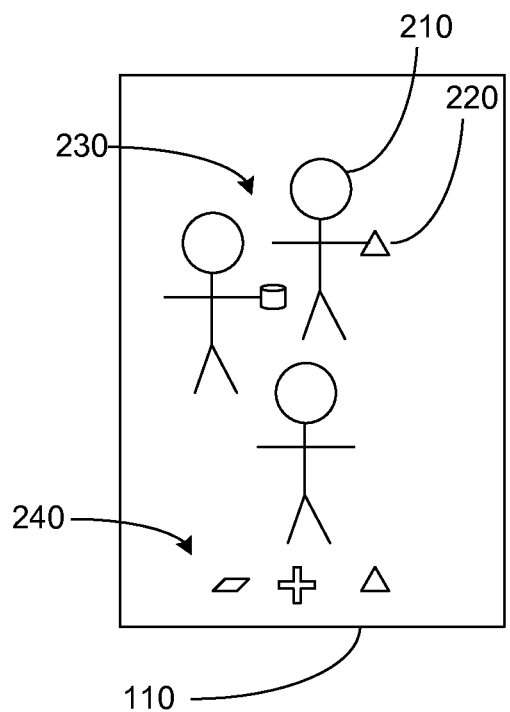
FIGS. 2A-C illustrate operation of the evolutionary content generator from FIG. 1, according to some embodiments disclosed herein.
Figure 2B:
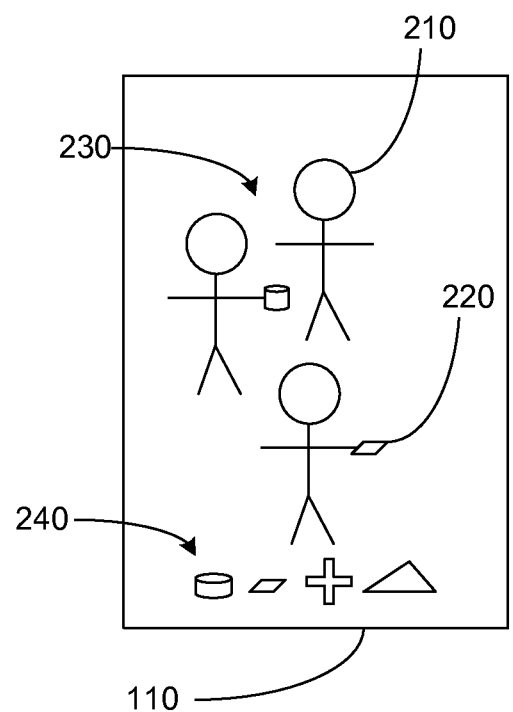
Figure 2C:
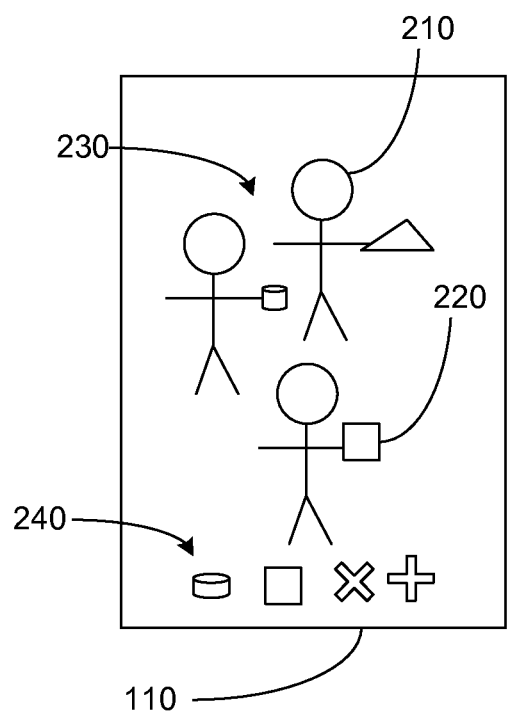

FIGS. 2A-C illustrate the evolution of content by evolutionary content generator 120, according to some embodiments disclosed herein. During the game, players 210 interact with content items 220 that exist in world 110. This interaction results in a content distribution 230 among players 210. Thus, at any point in time, world 110 includes distributed content items 230 as well as content items 240 that are available for distribution to players 210 through their interaction with items 220. Some non-limiting examples of how an item 220 is distributed to a player 210 include: a player picks up the object; a player buys the object; the player takes the object from another player; and the player is awarded the object for some action within the game. As play progresses, players 210 explore the game world 110 and discover new content that is generated by evolutionary content generator 120 and placed into the world 110. As shown in FIG. 2B, the content distribution 230 changes as play progresses because some items are more popular than others: players 210 tend to keep content items with which they are satisfied, while discarding content items with which they are not satisfied in favor of newly discovered content. The interaction of users with content items affects the evolution of newly generated content contained within the undistributed content 240 as shown in FIG. 2C. Specifically, content items that players 210 are satisfied with become parents of new generations of content, while content that is widely disliked filters out of the game. As game play continues, additional generations are evolved. In this way, players 210 continually explore a succession of changing content in world 110.

Thus, one embodiment of evolutionary content generator 120 can be described as: tracking popularity according to one or more users of at least a portion of a plurality of game content items available in a game world, where the game world is associated with the computer game; evolving an additional game content item based on the popularity of the tracked game content items, where the usage of each tracked game content item determines a reproduction availability of the tracked game content item; and inserting the additional game content item into the game world.

Another embodiment of evolutionary content generator 120 can be described as: tracking usage by one or more users of at least a portion of a plurality of game content items available in a game world, where the game world is associated with the computer game; selecting for reproduction a subset of the tracked game content items based on the respective usage, where the probability of selecting each of the tracked game content items for reproduction is proportional to the usage; reproducing using the selected subset of game content items to generate an additional game content item; and inserting the additional game content item into the game world; and inserting the additional game content items into the game world.

In some embodiments, a player 210 is allowed to collect different content items, and/or multiple instances of the same content items. That is, a player 210 may, at a particular point in game play, hold three weapons and one vehicle. In some of these embodiments, the total number of different items and/or total number of instances of the same item may be limited. That is, the player 210 may be limited to three offensive weapons and two defense mechanisms. In some embodiments, a player 210 is provided with information about the characteristics of a content item before that item is selected. In some embodiments, a player 210 is given a preview or demonstration of how the content item operates rather than simply being given information about the characteristics.

Thus, evolutionary content generator 120 directs evolution based on implicit information expressed by user interaction with particular items of content. In some embodiments, user interaction is captured in a fitness score for each item of content in game world 110.

Figure 3:
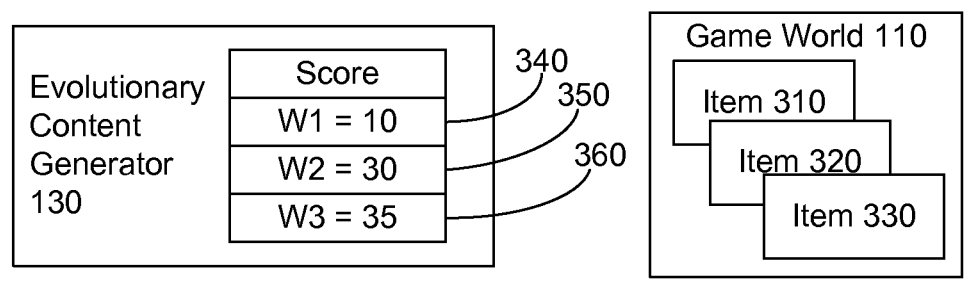
FIG. 3 illustrates the use of a fitness score by the evolutionary content generator from FIG. 1, according to some embodiments herein.

FIG. 3 illustrates the use of a fitness score by evolutionary content generator 120. In the example of FIG. 3, game world 110 includes three items of content (310; 320, 330) and generator 120 tracks a corresponding fitness score (340, 350, 360) for each. Each fitness score 340, 350, 360 is computed based on player interaction with the respective item 310, 320, 330. For example, if game play involves players choosing a weapon from a set of weapons available in world 110, then one embodiment of generator 120 gives a higher score to a weapon that is chosen or used more often, or by more players, and gives a lower score to weapons that are not preferred by players. In another embodiment of generator 120, lower scores are associated with items that are more preferred. Importantly, the fitness score is driven by normal player interaction with the game, and does not require specific player feedback in the form of a preference or grade for an item. Since scores are tracked on an item basis, the content generated in a multi-player game is not merely an average of all player preferences, but is instead unique content reproduced from individual items that are popular.

For some types of content items, an initial fitness score is assigned when the user selects the item, and the score increases while the user keeps the items (possibly up to a maximum value). For other types of items, an item's score increases as it is selected by more users. For still other types of items, an initial score is assigned and is then increased according to specific actions (e.g., score increases each time a weapon is fired)

Having explained how fitness is tracked, several different types of evolution will now be described. One embodiment of evolutionary content generator 120 breeds using items already in game world 110 to produce new generations of content. The content items that are chosen to be parents are selected based on fitness of the items. In some embodiments, the parents are chosen probabilistically, such that the chance of being chosen as a parent is proportional to the item's fitness.

Figure 4:
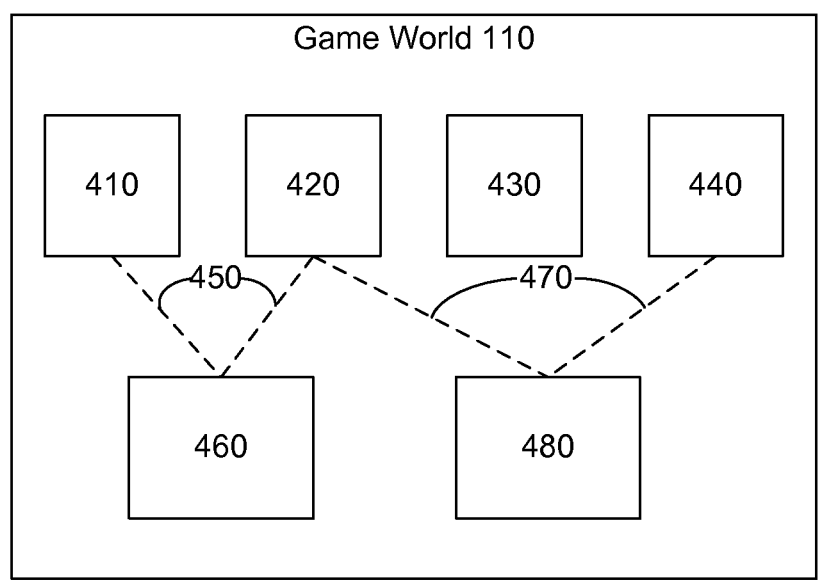
FIG. 4. illustrates evolution from items already present in the game world 110 from FIG. 1, according to some embodiments herein.

An example of evolution from items already present in game world 110 is illustrated in FIG. 4. In this example, game world 110 includes items 410, 420, 430, and 440. Evolutionary content generator 120 selects items 410, 420, 440 for breeding based on fitness scores. As indicated by arrow 450, item 410 breeds with item 420 to produce a next generation item 460. As indicated by arrow 470, item 420 also breeds with item 440 to produce next generation item 480. The fitness score of item 430 does not qualify that item for breeding. Mutation and crossover may occur during reproduction, so that children may become more complex than their parents.

As can be seen in FIG. 4, after an initial round of breeding, game world 110 contains content items from the original generation (i.e., 410, 420, 440) as well as content items from a new generation (i.e., 460, 480). The example shown in FIG. 4 uses "sexual" reproduction (i.e., multiple parents, though not limited to two), but other embodiments use "asexual" reproduction (i.e., only one parent), while still others used combinations of the two. All forms of reproduction involve some form of mutation or crossover of characteristics, which distinguishes reproduction from cloning.

Thus, the process used by the embodiment of content generator 120 shown in FIGS. 3 and 4 includes: assigning fitness scores to multiple items of game content based on player usage of the respective items; selecting a set of the items, based on the fitness scores; and adding new items of game content into the game world by spawning using the selected items as parents.

Figure 5:
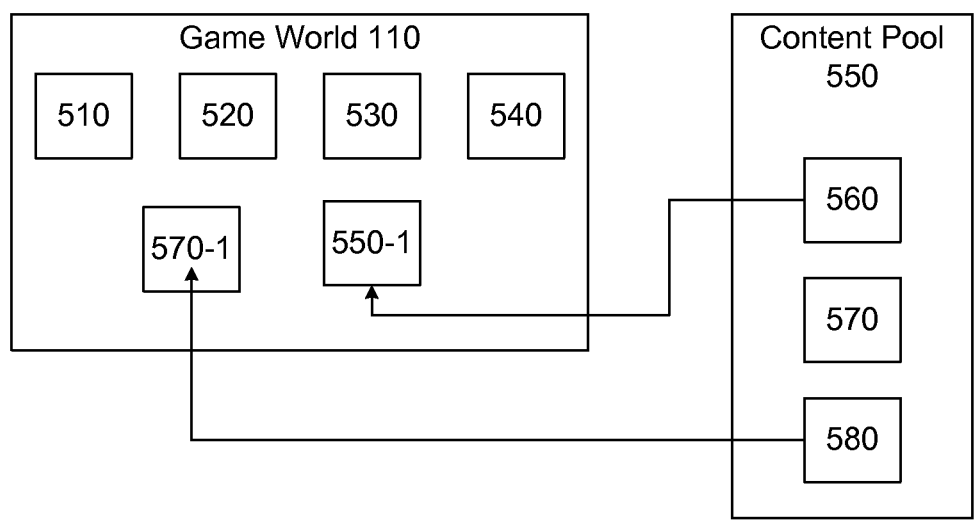
FIG. 5 illustrates evolution by spawning from a predefined content pool, according to some embodiments herein.

Another embodiment of evolutionary content generator 120 introduces new content into game world 110 by cloning from a separate predefined content pool rather than being reproduced from parents that already reside in the world. An example of evolution by cloning is illustrated in FIG. 5. In this example, the items residing in game world 110 initially include items 510, 520, 530, and 540, while a predefined pool 550 (outside of world 110) includes items 560, 570, and 580. Evolutionary content generator 120 then evolves the content by cloning item 560 to produce item 560-1 and places item 560-1 into the world 110. Generator 120 also clones item 580-1 and places items 580-1 into the world. In some embodiments, the selection of items for cloning is random.

In some embodiments, designers of the game initially select items for predefined pool 550. Some embodiments of evolutionary content generator 120 receive content descriptions from game designers and create the predefined pool 550 from these descriptions.

In some embodiments, the items residing in predefined pool 550 are items with desirable characteristics and are thus expected to be preferred by users. For example, if the items are weapons, then weapons in the predefined pool have characteristics like high accuracy, long range, high stopping power, etc. As another example, if the items are vehicles, then vehicles in the predefined pool have characteristics like high maximum speed, high acceleration, good cornering, etc.

Cloning from predefined pool 550 ensures that diversity is not lost and that good types of content from the past (i.e., those that users liked) might reappear. Additionally, cloning ensures an initial seed of good content when the game first starts and players' preferences are unknown.

In some games, players 210 are provided content items with which to start play. Some embodiments of evolutionary content generator 120 provide players 210 with randomized content at the start. Other embodiments of evolutionary content generator 120 start the game by distributing items to players 210 from a starter pool of content items. Because all players begin the game with it, content in the starter pool content does not contribute to evolution. Therefore, content in the starter pool is not actually used as a parent in the reproduction process. However, the fitness of starter pool content items does change as users interact with these items. Therefore, it is possible for a starter pool item to be selected during evolution for reproduction. In such cases, an item is randomly selected instead from predefined pool 550, and this item from predefined pool 550 is spawned into the game world.

Some embodiments of evolutionary content generator 120 utilize a recently-used pool which includes content items that were recently possessed by players 220 who subsequently left game world 110. This recently-used pool queue provides a reasonable number of content items which can be used as parents for breeding even when a small number of players is participating in the game.

Some embodiments of evolutionary content generator 120 utilize an archive pool which includes all content that achieves a particular level of fitness during game play. When such content reaches this level of fitness (which varies among types of games), it is automatically saved to the archive pool.

Some embodiments of evolutionary content generator 120 combines reproduction from parents residing in game world 110 with cloning from predefined pool 550. In some of these embodiments, the probability of new content being introduced into game world 110 through reproduction is $P_R$ and the probability of new content being introduced from predefined pool 550 is $P_{NE}$. These values are typically set by the game designer.

Creation and insertion of new content items into game world 110 may be triggered by various user actions. For example, destruction of an enemy, or a group of enemies, or enemies at a particular location may trigger insertion of a new weapon. Triggers for creation and insertion of new content items into game world 110 may be related to time, e.g., may occur at predefined intervals, at random times, etc. Triggers for creation and insertion of new content items into game world 110 may be related to a number of items, e.g., to maintain a predefined number of items not yet distributed to players 210, to maintain a predefined number of total items in world 110, to maintain a predefined number of items of each type, etc.

In some embodiments, a new content item is spawned into the game world by one of multiple methods, with the particular method chosen being based on a fixed probability. Two of the methods were discussed above: reproduction from the current content pool existing in the game world, with random selection of parent(s); and cloning from predefined pool 550. A third method is random generation using a variety of item characteristics (e.g., weapon range, weapon projectile size, weapon projectile rate, etc.)

One example of the probabilities used to select these methods of item generation are as follows: random=10%; predefined pool=10%; reproduction=80%. if a starter item (i.e., from the starter pool) is selected for reproduction, then an item from predefined pool 550 is cloned instead. Higher fitness items have a higher chance of producing offspring, thereby enabling players to directly affect the course of evolution.

According to the content generation methods disclosed herein, the population size (i.e. those items that are eligible at any given time to reproduce) is variable and depends entirely on the number of users in the system. That is, when more users play the game, more items receive a score and are thus eligible for being chosen as parents.

Content items generated according to the methods disclosed herein are not immediately eligible to reproduce. Instead, these items are in a special temporary state (i.e., placed somewhere in game world), in which the item may join the population only if a user chooses to acquire it or interact with it.

According to the content generation methods disclosed herein, the determination as to which items leave the population (i.e., are no longer eligible for reproduction) is made by users, by simply discarding items, rather than by fitness scores.

According to the content generation methods disclosed herein, users do not explicitly communicate to the system which content they like. Instead, the preferred content is deduced by the system implicitly from natural human behavior. That is, users do not need to know that they are interacting with an evolutionary algorithm yet evolution still works anyway.

According to the content generation methods disclosed herein, the steps of the method are asynchronous. That is, players may cause content to join the population or be eliminated at any time.

In some embodiments, each game content item is represented by an artificial neural network (ANN) and reproduction as discussed in FIG. 4 is performed according to the NeuroEvolution of Augmenting Topologies (NEAT) algorithm. NEAT begins evolution with a population of small, simple networks and complexities the network topology into diverse species over generations, leading to increasingly sophisticated behavior. The NEAT algorithm is further described in "Evolving neural networks through augmenting topologies", K. O. Stanley and R. Mikkulainen, Evolutionary Computation, vol. 10, pp. 99-127, 2002, the entirety of which is incorporated herein by reference.

To keep track of which gene is which while new genes are added, NEAT uniquely assigns a historical marking to each new structural component. During crossover, NEAT aligns genes with the same historical markings, efficiently producing meaningful offspring. Traditionally, speciation in NEAT protects new structural innovations by reducing competition between differing structures and network complexities. However, in the applications described herein, the usual speciation procedure in NEAT is unnecessary because a human performs selection rather than an automated process.

The process of complexification, which resembles how genes are added over the course of natural evolution, allows NEAT to establish high-level features early in evolution and then later elaborate on them. For evolving content, complexification means that content can become more elaborate and intricate over generations.

In some embodiments, each game content item is represented by a compositional pattern-producing network (CPPN). CPPNs are a variation of artificial neural networks (ANNs) that differ in their set of activation functions and how they are applied. While ANNs often contain only sigmoid or Gaussian activation functions, CPPNs can include both such functions and many others. The choice of CPPN functions can be biased toward specific patterns or regularities. For example, periodic functions such as sine produce segmented patterns with repetitions, while symmetric functions such as Gaussian produce symmetric patterns. Linear functions can be employed to produce patterns with straight lines. In this way, CPPN-based systems can be biased toward desired types of patterns by carefully selecting the set of available activation functions.

Having described general principles, application of those principles to an example will now be described: the Galactic Arms Race (GAR) game. The goal of GAR is to pilot a space ship to defeat enemies, gain experience, earn money, and most importantly, to find advantageous new weapons that are automatically generated by the evolutionary algorithm described earlier. That is, in GAR the content items which undergo evolution are weapons.

GAR has a single-player mode, in which evolution is directed by the actions of a single player battling aliens. The aliens are controlled by scripted steering behaviors rather than players.

In one embodiment described herein, each player weapon is a particle system. Particle systems are usually defined by (1) a set of points in space and (2) a set of rules guiding their behavior and appearance, e.g. velocity, color, size, shape, transparency, rotation, etc. However, such rule sets can be complex and are usually hand-coded. In GAR, the player weapon contains a single evolved CPPN. For every frame of animation, each particle issued from the weapon inputs its current position relative to the ship (px, pz) and distance from the ship (dc) into the CPPN. There are two, rather than three, spatial inputs because the game is entirely situated on the y=0 plane. The CPPN is activated and outputs the particle's velocity (vx, vz) and color (r, g, b) for that animation frame.

Weapon fitness in GAR is automatically calculated based on player usage statistics, gathered as follows. Players possess up to N weapons at one time in an arsenal. When a player fires a weapon, that weapon (which is a unique member of the population) gains fitness at a constant rate and the other weapons in that player's arsenal lose fitness at the same rate. In some embodiments, the minimum fitness is 1 and there is no maximum value. This sort of fitness decay mechanism for unused weapons emphasizes emerging new weapon trends.

In GAR, one trigger even for spawning a new weapon is destruction of an enemy base or an enemy commander. As described earlier, methods for spawning a new weapon include reproduction within the current population present in game world 110 and cloning from predefined pool 550, with a probabilistic method based on weapon fitness randomly deciding which weapon(s) reproduces.

In single-player GAR, the weapon population includes only the weapons the single player currently holds in his arsenal. In multi-player GAR, the weapon population includes the weapons currently held by all players. Thus single-player evolution is to some extent greedy; however, it is not equivalent to a normal evolutionary algorithm with a population of N because the player encounters a significant number of weapon previews in addition to the weapons in the ship's current arsenal. Therefore, the player is in effect judging such previews by taking them or not.

When the game begins, players have no history of weapon preference. One possible policy is to initially give players N random weapons. However, such randomization could cause new players to receive N undesirable weapons. A better solution is for players to begin the game with a predefined set of starter weapons. The starter weapons are viable: shoot only in a straight line, and not eligible to reproduce during evolution. Thus, new players are guaranteed to begin with viable weapons.

Because starter weapons cannot reproduce and players begin the game with only starter weapons, a method is needed to start evolution. For this purpose, predefined pool 550 includes a diverse collection of acceptable weapons generated (in some cases, evolved) by the game developers. If the weapon selected for reproduction by the evolutionary algorithm is a starter weapon (e.g., selected because the player fires that starter weapon often), the evolutionary process clones a random weapon from predefined pool 550 into game world 110.

One advantage of predefined pool 550 is that it provides a jump start to evolution at the beginning of the game. Thus, developers can influence what weapons players will see early in the game. Predefined pool 550 can also serve as a hall of fame, to which popular weapons are retired, possibly reappearing later in the game.

In one embodiment of GAR, the content items are particle system weapons, and each player weapon contains a single evolved CPPN. In every frame of animation during game play, each particle issued from the weapon inputs its current position relative to the ship (px, pz) and distance from the ship (dc) into the CPPN. Two spatial inputs are used when the game is two-dimensional, i.e., entirely situated on the y=0 plane. The CPPN is activated and outputs the particle's velocity (vx, vz) and color (r, g, b) for that animation frame. Representing particle velocity and color in this manner produces a wide of variety of vivid patterns. Because CPPNs are a superset of ANNs, which can approximate any function, particle weapons in GAR can theoretically evolve any conceivable pattern.

Calculation of fitness based on player usage may account for different influences. As one example, certain weapons, by their nature, require more shots to be effective (e.g. wall guns for blocking incoming projectiles). As another example, players that participate in the game more often might disproportionately influence evolution (i.e. by firing their weapons more often). To address these two influences, some embodiments of the evolutionary processed disclosed herein calculate fitness as follows. When a player fires a weapon, that weapon (which is a unique member of the population) gains fitness at a constant rate and the other weapons in that player's arsenal lose fitness at the same rate. This fitness decay mechanism for unused weapons emphasizes emerging new weapon trends and ensures that weapons that require more firing do not come to dominate. Furthermore, the minimum fitness is 1 and the maximum fitness is 1,000, which means that older players do not create a disproportionate effect.

Figure 6:
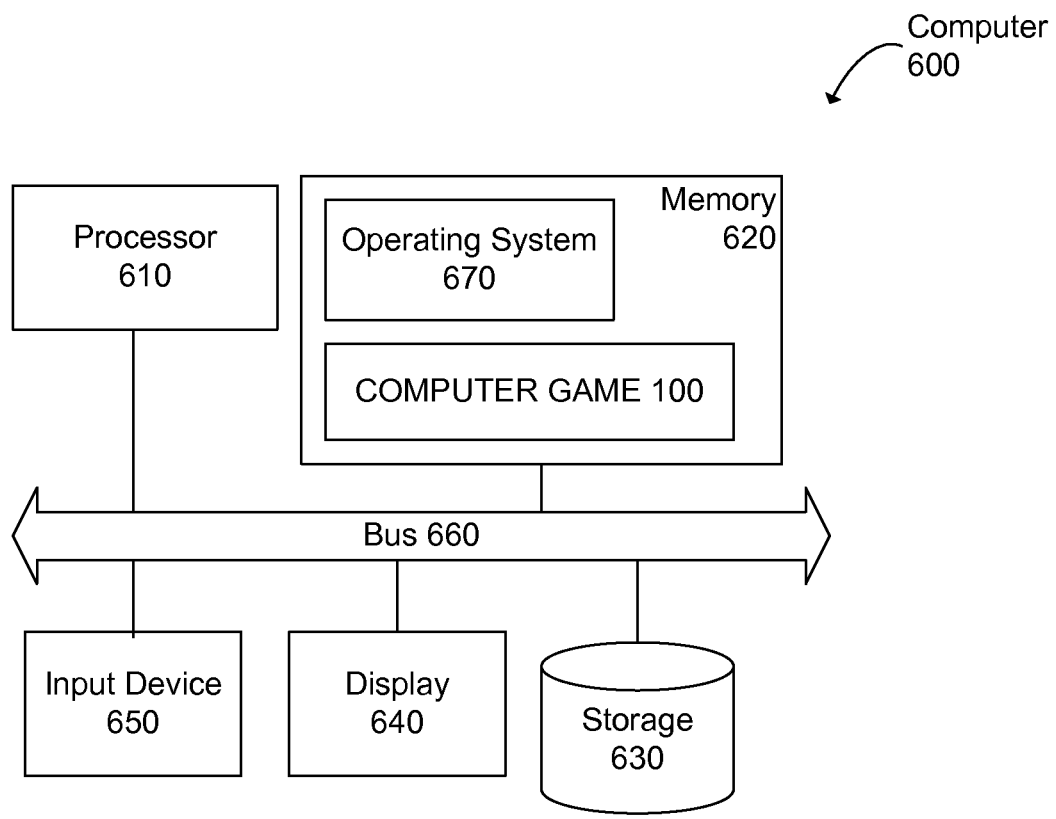
FIG. 6 is a hardware block diagram of one embodiment of a computer implementing the game from FIG. 1, according to some embodiments disclosed herein.

FIG. 6 is a hardware block diagram of one embodiment of a computer 600 implementing the game 100 of FIG. 1. The computer contains a number of components that are familiar to a person of ordinary skill in the art, including a processor 610, memory 620, non-volatile storage 630 (e.g., hard disk, flash RAM, flash ROM, EEPROM, etc.), a display 640, and one or more input devices 650. The components are coupled via one or more buses 660. The input devices can include, but are not limited to: keyboard, mouse, touch pad, touch screen, motion-sensitive input device, gesture-sensitive input device, inertial input device, gyroscopic input device, joystick, game controller, etc. Omitted from FIG. 6 are a number of conventional components, known to those skilled in the art, that are not necessary to explain the operation of the computer.

The game 100 can be implemented by specialized hardware logic, software (i.e., instructions executing on a processor), or a combination thereof. Hardware embodiments include (but are not limited to) a programmable logic device (PLD), programmable gate array (PGA), field programmable gate array (FPGA), an application-specific integrated circuit (ASIC), a system on chip (SoC), and a system in package (SiP). In a software embodiment, memory 620 stores various software components which are executed by processor 610, for example, an operating system 620 and game 100.

These executable components can be embodied in any computer-readable medium for use by any processor which fetches and executes instructions. In the context of this disclosure, a "computer-readable medium" can be any means that can contain or store the program for use by, or in connection with, the processor. The computer readable medium can be based on electronic, magnetic, optical, electromagnetic, or semiconductor technology.

Specific examples of a computer-readable medium using electronic technology would include (but are not limited to) the following: a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) a portable compact disk read-only memory (CD-ROM) and a digital video disc read-only memory (DVD-ROM).

The foregoing description has been presented for purposes of illustration and description. It is not intended to be exhaustive or to limit the invention to the precise forms disclosed. Obvious modifications or variations are possible in light of the above teachings. The embodiments discussed, however, were chosen and described to illustrate the principles of the invention and its practical application to thereby enable one of ordinary skill in the art to utilize the invention in various embodiments and with various modifications as are suited to the particular use contemplated. All such modifications and variation are within the scope of the invention as determined by the appended claims when interpreted in accordance with the breadth to which they are fairly and legally entitled.

We claim:

1. A method for evolving one or more new game content items in a game world of a computer game, comprising:
    a) providing a plurality of different types of existing game content items in the game world;
    b) interacting by the first player with a first item of said plurality of different types of existing game content items in the game world,
    c) distributing, as a result of the interaction, the first item to the first player such that the first item becomes a distributed content item which is available only to the first player for a portion of a time period;
    wherein, of the plurality of different types of existing game content items, the different types of existing game content items that are not the distributed content item are an undistributed content item;
    wherein, at any point in time, there is the distributed content item and the undistributed content item of the plurality of different types of existing game content items, and the undistributed content item is available to the plurality of players for the time period;
    further wherein the undistributed content item remains available in the game world for distribution to any of the plurality of players through their interaction with said undistributed content item;
    d) tracking the interaction of the first player with said distributed content item and assigning a fitness score to the distributed content item based at least in part on an amount of interaction between the first player and the distributed content item;
    e) randomly selecting a selected probability among a first probability, a second probability, and a third probability;
    f) using the selected probability to create, probabilistically, a new content item using an evolutionary content generator
    wherein the first probability is proportional to the fitness score of the distributed content item;
    wherein the second probability is a chance the new content item is randomly generated using one or more item characteristics;
    wherein the third probability is a chance the new content item is selected from a predefined pool;

wherein the new content item is available, for the time period, to the plurality of players;
wherein the new content item has one or more characteristics in common with the distributed content item; and
    (g) iteratively repeating steps (b)-(f) continuously.

2. The method of claim 1, further comprising:
cloning the new content item from the distributed content item when the fitness score of the distributed content item exceeds a popularity threshold of that distributed content item;
wherein the popularity threshold of the distributed content item is a minimum fitness score.

3. The method of claim 1, further comprising using the distributed content item to generate the content item.

4. A computer program product evolving a new game content item available to a player in a game world of a computer game, the computer program comprising a computer readable storage medium having program instructions embodied therewith, wherein the computer readable storage medium is not a transitory signal per se, the program instructions are readable by a computer to cause the computer to perform a method comprising the steps of:
    providing a plurality of different types of existing game content items in the game world;
    interacting by the first player with a first item of said plurality of different types of existing game content items in the game world,
    distributing, as a result of the interaction, the first item to the first player such that the first item becomes a distributed content item which is available only to the first player for a portion of a time period;
    wherein, of the plurality of different types of existing game content items, the different types of existing game content items that are not the distributed content item are an undistributed content item;
    wherein, at any point in time, there is the distributed content item and the undistributed content item of the plurality of different types of existing game content items, and the undistributed content item is available to the plurality of players for the time period;
    further wherein the undistributed content item remains available in the game world for distribution to any of the plurality of players through their interaction with said undistributed content item;
    tracking the interaction of the first player with said distributed content item and assigning a fitness score to the distributed content item based at least in part on an amount of interaction between the first player and the distributed content item;
    randomly selecting a selected probability among a first probability, a second probability, and a third probability;
    using the selected probability to create, probabilistically, a new content item via an evolutionary content generator;
    wherein the first probability is proportional to the respective fitness score of the distributed content item;
    wherein the second probability is a chance the new content item is randomly generated using one or more item characteristics;
    wherein the third probability is a chance the new content item is selected from a predefined pool;
    further wherein in a first scenario, the new content item is created based on the highest probability of the first, second, and third probabilities, and upon creation, the new content item is one of the undistributed content item.

\* \* \* \* \*